(12) United States Patent
Mamo

(10) Patent No.: US 6,696,766 B1
(45) Date of Patent: Feb. 24, 2004

(54) ATMOSPHERIC COLD MEGAWATTS (ACM) SYSTEM TM FOR GENERATING ENERGY FROM DIFFERENCES IN ATMOSPHERIC PRESSURE

(76) Inventor: Anthony C. Mamo, 1515 E. Central Rd. Apt. 264, Arlington Heights, IL (US) 60005

( * ) Notice: Subject to any disclaimer, the term of this patent is extended or adjusted under 35 U.S.C. 154(b) by 0 days.

(21) Appl. No.: 10/231,387

(22) Filed: Aug. 29, 2002

(51) Int. Cl.$^7$ ................................................. F03D 5/00
(52) U.S. Cl. ....................................... 290/1 R; 290/54
(58) Field of Search ............................. 290/1 R, 43, 44, 290/54, 55; 60/639, 325

(56) References Cited

U.S. PATENT DOCUMENTS

| | | | | |
|---|---|---|---|---|
| 3,436,908 A | * | 4/1969 | Van Delic | 126/634 |
| 3,894,393 A | * | 7/1975 | Carlson | 60/641.1 |
| 4,132,901 A | * | 1/1979 | Crausbay | 290/53 |
| 4,471,612 A | * | 9/1984 | Buels | 60/398 |
| 4,497,177 A | * | 2/1985 | Anderson | 60/641.12 |

* cited by examiner

*Primary Examiner*—Nicholas Ponomarenko

(57) ABSTRACT

A system for the generation of energy based upon the differences in the atmospheric pressure at geographically spaced apart sites, referred herein as the "Atmospheric Cold Megawatt" energy producing system of the invention (hereinafter "ACM") comprises at least one long conduit, in the order of many miles long, preferably of at least two portions of different internal areas capable of conducting significant amounts of air there through. In operation the air flow in the conduit will accelerate to a high velocity wind without the consumption of any materials and without the use of any mechanical moving parts. A power converter, such as a wind turbine, in the conduit converts the high wind velocity generated by even minute pressure differences into energy of any desired type such as electricity. The opposite open ends of the conduit are located at geographically spaced sites preferably selected on the basis of historical information indicating an historical useful difference in barometric pressure. A plurality of conduits each having open ends in different geographically spaced sites may be interconnected to maximize the existing pressure differences that will assure higher and more consistent levels of energy production.

33 Claims, 3 Drawing Sheets

NOT TO SCALE

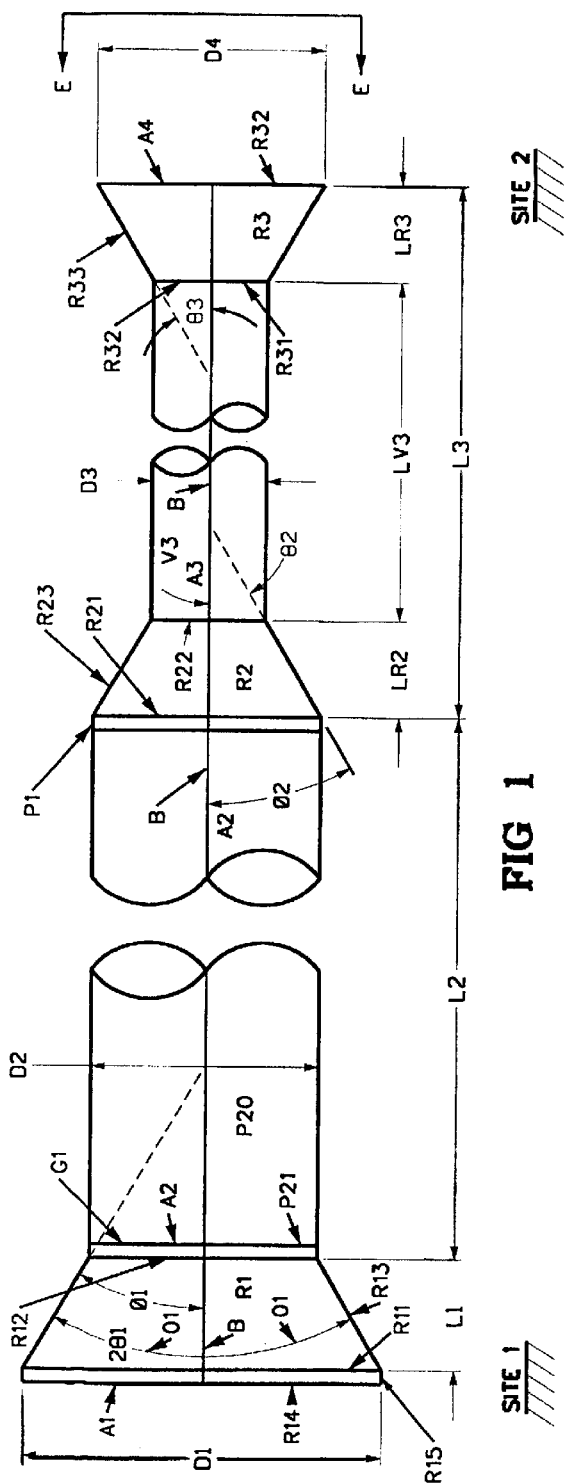
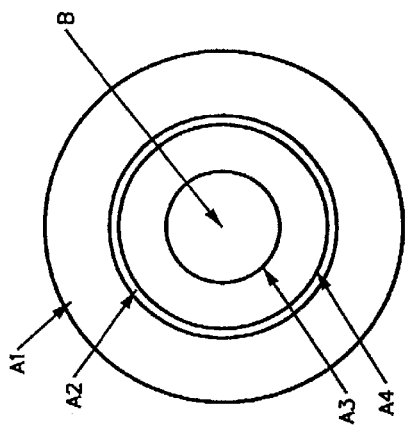
FIG 1
FIG 1A
VIEW E-E

NOT TO SCALE

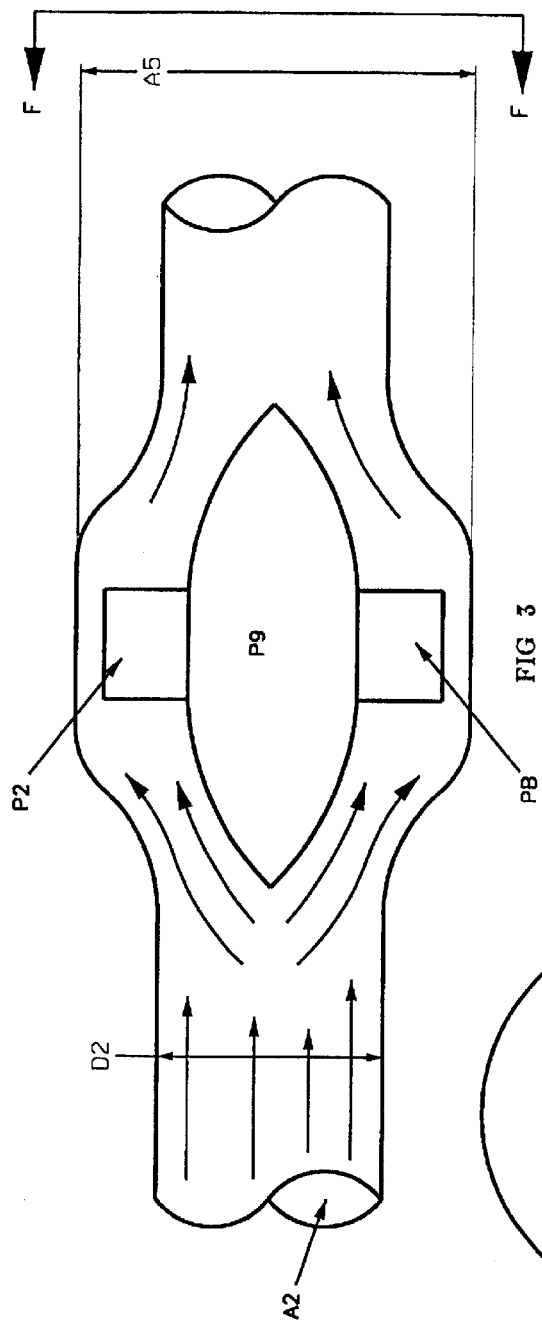
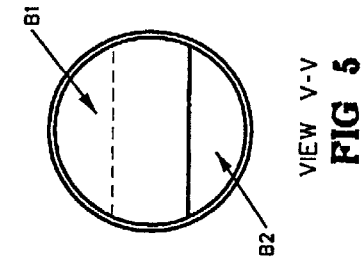
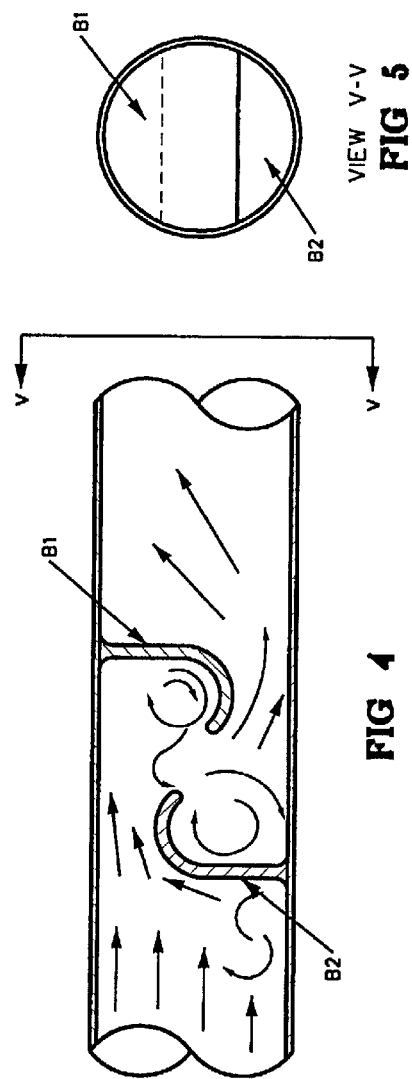
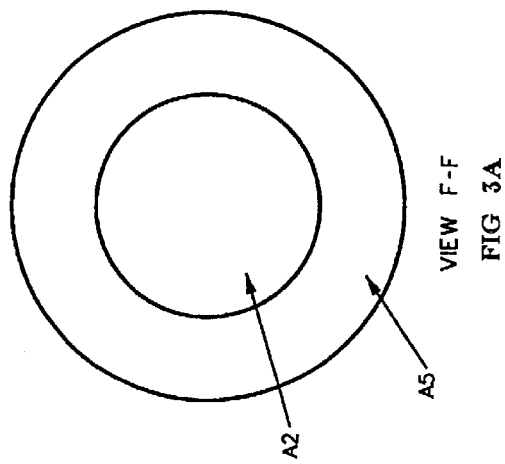

ATMOSPHERIC COLD MEGAWATTS (ACM) SYSTEM TM FOR GENERATING ENERGY FROM DIFFERENCES IN ATMOSPHERIC PRESSURE

This application is based upon a Patent Disclosure Document number 509366 Received in the USPTO on Apr. 5, 2002.

BACKGROUND OF THE INVENTION

Energy provides the fuel for modern industry and commerce and hence is critically important for its continued viability and growth. Combustibles such as wood, coal and oil are not only nonrenewable, difficult and expensive to recover and the cause of serious international problems, but they increase pollution, global warming and have other well known problems. Accordingly great study, effort and expense has been given to finding alternatives. Solar is expensive, inefficient and does not lend itself to producing megawatts of power at an economically attractive cost.

Waterpower is limited by the supply of water at higher elevations and for the most part has been exploited in most parts of the world where energy is needed. Hence it is of limited value to meet increased energy needs.

Windmills have been used throughout the ages and more recently have been the subject of renewed interest using modern technology. Nevertheless, large modern windmills have shortcomings including the facts that they:

(a) are highly subject to lightning strikes,
(b) have high mechanical fatigue failure,
(c) are limited in size by hub stress,
(d) must be pivotally mounted,
(e) must be feathered in winds over 28 mph to prevent destruction,
(f) do not produce energy in winds below 8 MPH,
(g) require a 30 to 1 ratio transmission,
(h) require variable pitch blades,
(i) do not function well, if at all, under conditions of heavy rain, icing conditions or very cold climates, and
(j) are noisy and cannot be insulated for sound reduction due to their size and subsequent loss of wind velocity and power.

In view of the above and published average power output, it appears that the best windmill farms would be very hard pressed to deliver the equivalent power output of a 14 MPH average wind velocity, per resident windmill, per year. By contrast, the ACM pipe is not limited by problems (a) through (j).

Another recent form of energy production involves nuclear fission. However although this form was thought to be the answer to supplying power, it also has produced many problems. Thus, for example, nuclear power plants have produced billions of tons of deadly waste products, some having a 27,000 year half life. Although the energy chamber of nuclear plants is made of the finest quality double x-rayed 6-inch thick stainless steel, the pressure, temperature and corrosive environment causes the 6-inch thick walls to often require replacement or repair every 4 to 6 years. The nuclear plants must be located near a large body of water and far from residential areas. The nuclear plants are only $\frac{1}{10}$ of 1% efficient and the plants must be shut down every 30 to 50 days for replacement of the spent uranium, which replacement takes days to weeks. Also, many millions of dollars of taxpayers money is spent per year to bury the deadly waste products of atomic energy, in places such as the manmade tunnels in mountains such as Yucca Flats, Nev.

In addition, it is estimated that atomic power plants increase global warming by $2.58 \times 10^{15}$ BTUs per year, while simultaneously increasing pollution by a number in the order of 452,000,000,000 lbs. per year based on utility company published numbers of 671 pounds per 1000 kw hours per year. Putting this number in perspective, it should be noted that $2.58 \times 10^{15}$ BTUs could heat and cool about 63,000,000 homes each with 1000 kWh/month for an entire year. Also of great concern is the inescapable fact that nuclear plants are always a potential source of accidental or terrorist activated mechanisms of catastrophic mass annihilation. The ACM pipe eliminates all of these problems and concerns.

SUMMARY OF THE INVENTION

A system for the generation of energy based upon-the difference in the barometric pressure at geographically spaced sites, referred to herein as the "Atmospheric Cold Megawatt" energy producing system of the invention (hereinafter "ACM"), comprises at least one long conduit, in the order of many miles, preferably of at least two sections of different internal areas capable of conducting significant amounts of air therein and having a power converter therein. While it would be possible to use a conduit of only a single cross sectional internal area, the cost would be 130 times greater and the air acceleration rate would be 99.99% less.

The term "cold megawatts" is used to distinguish the inventions in ACM from all fuel and heat dependent energy generating means. In the preferred embodiment each conduit has at least one funnel shaped portion and at least two sections of differing internal areas. The conduit ends are located at geographically spaced sites designed on the basis of historical information to be far enough apart to encounter a historically useful difference in barometric pressure. Useful is considered to be any pressure that produces the required or desired power since even minute pressure differences can generate substantial amounts of power.

The ACM conduit configuration of the invention can transform even barometric pressure differences in the order of one tenth pound per square inch into wind velocities in the sonic range. This high wind velocity serves to drive an internal power converter means, such as a wind turbine for example, which will convert the energy into any desired type of power output, such as electrical, hydraulic, pneumatic, etc.

In operation, energy per se is generated without consumption of materials and without mechanical moving parts. Air will flow into the conduit at a first site of high barometric pressure and travel through the conduit pipe and out the end located at a second site of the low barometric pressure. As the conduit decreases in cross sectional area in accordance with the invention, the air accelerates through the conduit and takes the form of a high velocity wind that provides an energy source from which power may be extracted by at least one energy converting means. It will be understood of course, that the energy converting means have moving parts.

At least one flow control means such as a gate or variable orifice may be strategically located in the conduit or conduits to regulate the wind conduit path and velocity to provide the most efficient and maximum power output. The energy converting means are strategically located in the pipe or pipes to extract power from the wind energy as the wind moves past the energy converting means at high speed.

Additional ACM conduits extending from and having ends in other spaced geographic locations or sites may be interconnected and air flow controlled to maximize the flow for greatest barometric pressure differences between the conduit ends for even greater output power than could be achieved by fewer conduits.

The cold energy ACM pipe has all the advantages of windmills, and none of the several disadvantages outlined herein. Thus, for example, the heights of the windmills (many in the order of 250–328 feet), their required high geographical location necessary to capture maximum wind force and their electrically conductive construction make them very vulnerable to destructive lightning strikes.

Mechanical fatigue failure results from the high length to width ratios, the blade weight and the double stress reversal in each blade per each revolution.

With regard to noise, the ACM pipe has acceptable sound levels over 99% of its length and in those places where noise does occur, it may be easily overcome by insulation or other sound deadening means . While the ACM conduit's power converter is basically just as noisy as the windmill, that noise is entirely inside the ACM conduit and may be easily reduced as required. The sound controlling insulation may be internal and/or external and does not reduce power output as it does in windmills. By contrast to the average wind speed of 14 mph for the best windmill farms, the ACM conduit pipe can, for example, provide 550 mph wind velocities in 2.97 seconds with as little as one tenth (0.1) psi pressure difference; an acceleration of 271.8 feet per second per second results.

Because of unknown variables and because it is for purposes of presenting broad distinctions, the quantification of the differences with prior art structures and methods such as the power output between windmills and the ACM system, the calculations omit friction and use a standard atmosphere. It will be understood by those skilled in the art that windmill horsepower varies according to the laws of "Dynamic Similarity". These laws of dynamic similarity provide an exact time tested method of evaluating all of the pertinent variables of turbo machinery. These laws indicate that power varies as the square of the wind speed; the cube of the rpm; and the fifth power of the diameter. Thus, a state of art windmill farm operating under the very best average yearly wind speed per resident windmill per year will encounter a wind speed of 14 mph. With 60 rpm used for electrical generating efficiency and a blade diameter of 256 feet, the calculations are $14^2 \times 60^3 \times 256$ to the fifth power for a total of $4.16 \times 10^{19}$. By exact comparison, the ACM pipe with an air speed of 550 mph, the factors are $550^2 \times 975^3 \times 44^5 = 4.624 \times 10^{22}$; which reveals that the ACM pipe could produce the power of a windmill farm of about 996 large state of the art windmills as defined above.

The profitable operating life span of the ACM pipe is estimated to be at least 3 times greater, and the ACM maintenance, repairs and operating costs are estimated to be less than 15% of that of windmills.

By the numbers, therefore, it could be said that the overall relative merits between the ACM system and windmills, considering the above power output, profitable lifespan and operating costs, can be generally represented by: $996 \times 3 \times 6.67 = 19,929$ to one in favor of the ACM pipe over windmills.

Furthermore, if each of the large windmills has 5 moving parts, it could be claimed that the ACM pipe delivers the same energy with 4780 fewer moving parts. Also, based upon the absence of thousands of mechanical parts, the extremely low stress and the totally protected environment, the profitable life span of the ACM pipe could reasonably be expected to outlast the profitable life span of a windmill farm of the same output power, by a factor of between three and five to one.

By contrast with nuclear energy, an ACM power system would have none of the nuclear problems. Thus because ACM does not consume any materials and does not require heat, it would reduce global warming by $2.57 \times 10^{15}$ btu per year and reduce pollution by $4.52 \times 10^{11}$ pounds per year.

ACM will outlast any other energy system by tens of years and it will generate the wind velocity from which the energy is extracted without mechanical moving parts or depletion of materials.

The true cost of nuclear electricity, including building, maintaining, repairing, cooling, operating, waste disposal cost (excavating and tunneling at Yucca Flats, Nev. for example), transportation and storage of the nuclear waste (with its 27,000 year half life), the mining, smelting and machining of uranium 235, and last but not least, the very substantial and inevitable de-commissioning cost, is estimated to be magnitudes more than the cost of electricity generated with an ACM energy plant.

Based upon the foregoing, it will be understood that there is a dire and long felt need for an efficient, clean, environmentally safe means for generating the megawatts of power that are needed to meet civilizations' increasing needs, without increasing pollution, global warming or material depletion.

DESCRIPTION OF THE DRAWINGS

FIG. 1 is a nonscale schematic elevational cross sectional view of a preferred embodiment including the basic elemental components of the ACM system;

FIG. 1A is an end view of FIG. 1 showing in nonscale dimensions an example of the relative differences in the internal areas of the ACM system;

FIG. 3 shows an embodiment of a power converter ($P_2$) wherein the area A5 through the converter is larger than the inlet section ($A_2$);

FIG. 3A is an end view of FIG. 3 showing in nonscale dimensions an example of relative differences in the internal areas of the ACM system;

FIG. 4 is a schematic cross sectional view of a portion of a conduit of the system of FIG. 1 showing an embodiment of a baffle arrangement which may be used to generate heat; and FIG. 5 is an end view of FIG. 4 taken along lines V—V.

DESCRIPTION OF PREFERRED EMBODIMENTS

Figure 2:
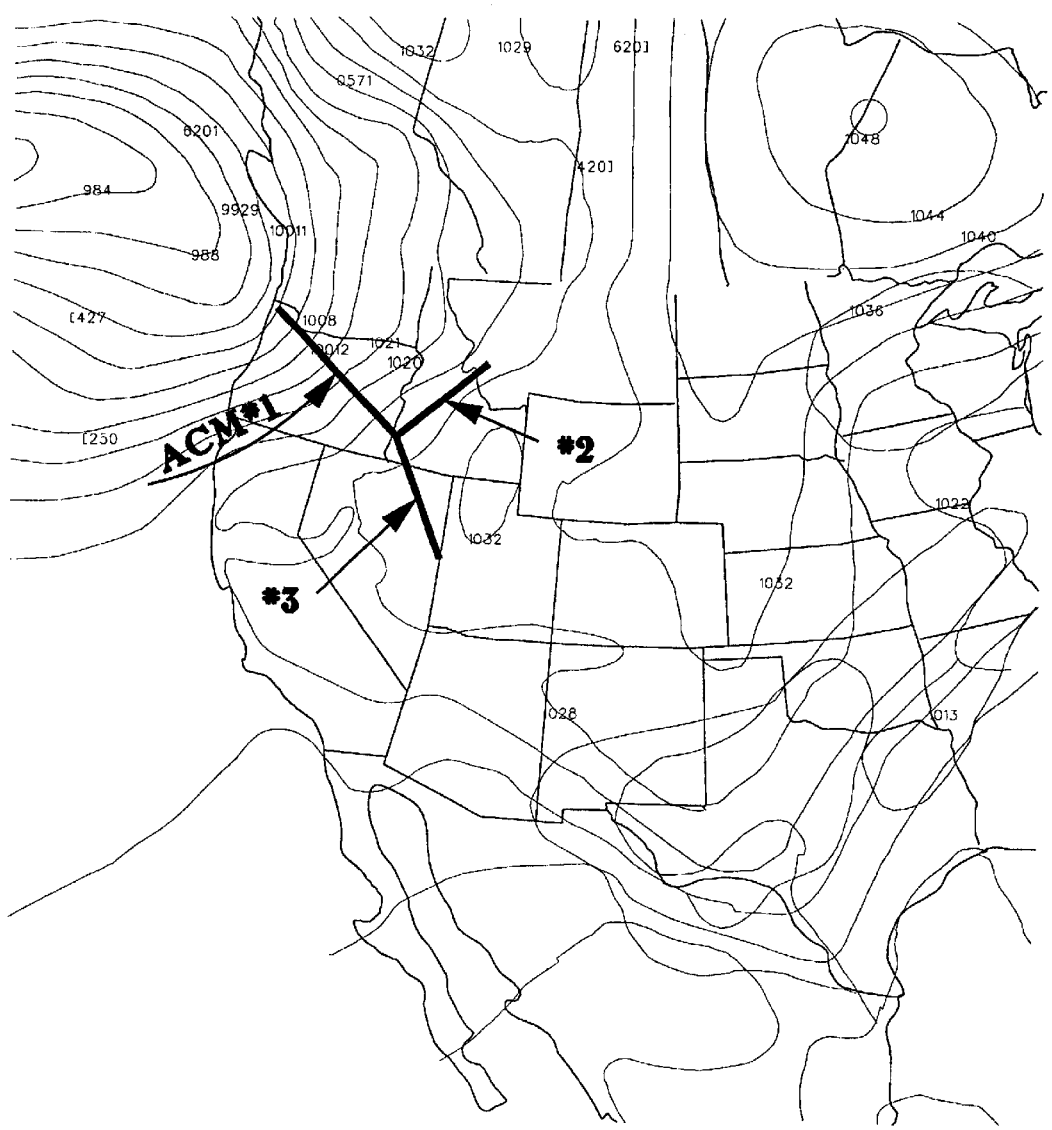
FIG. 2 is a typical weather chart of a portion of the United States showing isobars of equal pressure and an example of possible location sites for first, second and third ACM systems based on that chart and without historical data.

A preferred embodiment of an atmospheric cold megawatt system (ACM)™ of the invention for an environmentally friendly method and apparatus for generating megawatts of energy efficiently and cleanly comprises a conduit which is envisioned to include a pipe-like construction such as shown in FIG. 1 extending, as may be best understood from the map of FIG. 2, many miles from a first geographic site of higher barometric pressure, here shown as Site 1, to a second geographic site of lower barometric pressure, here shown as Site 2, whereby the differences in barometric pressure between the Sites 1 and 2 as indicated by the pressure lines on the map of FIG. 2 will cause atmospheric air to enter and flow through the conduit from the site of higher pressure to the site of lower pressure.

It is an important feature of the invention that with the pressure differential and as a result of the configuration of the ACM conduit or conduits, the air flowing through the conduit will increase in wind speed to provide a source of energy without the consumption of any materials and without the use of any mechanical moving parts.

The power in the high wind speed may be extracted by at least one energy converting means in the conduit such as a wind turbine and generate energy in any form such as electrical, hydraulic, pneumatic, or heat for example.

In a basic elementary form the conduit comprises at least first and second portions wherein with reference to FIG. 1 for example the first portion could include lengths L1 and L2 and the second portion could include length L3. These elementary first and second portions have respective first and second internal areas and preferably the first portion has a larger internal area than the second portion such that the average through flow of air in the second portion will be of greater velocity than the flow in the first portion.

The embodiment of FIG. 1, not to scale, shows a series of interconnected portions that may be referred to in whole or in part as "sections" for description purposes, forming a long closed pipe conduit including a first reduction section generally indicated at R1, a power section P20, a second reduction section R2, a vent section V3 and a third reduction section R3. Any number of embodiments are possible with more or fewer portions or sections of various cross sections and lengths. Thus, the velocity of air flow will increase in each case as air flows from a larger to a smaller cross sectional area such as R1 to P20 to R2 to V3 and will slow down in R3 as the area increases.

For purposes of illustration only, the cross sectional shape of the ACM conduit of the invention is shown as being circular in the figures with a central axis B extending there through and the size is referred to in terms of diameter in such cases. In fact, the shape of the cross sectional area may be of various and different configurations of any shape throughout it length including without limitation, oval, square, rectangular, etc. at various and different points along its length and hence the reference to diameters and the central axis B as used in the description of the first embodiment is to better facilitate visualization and may be changed to other key dimensions of the various cross sectional shapes and configurations. As will be understood, all areas "A" are internal cross sectional areas taken at a general 90 degree angle to the axis B at that cross sectional point.

In FIG. 1, the first reduction section R1 has an internal area A1 with an appropriate corresponding diameter D1 on a first end R11, an internal cross sectional area A2 with an appropriate corresponding diameter D2 on a second end R12, a length L1, sidewalls R13, and a central axis B. In one embodiment the area A1 is in the order 14400 square feet for a diameter D1 in the order of 135 feet, area A2 is in the order of 121 square feet for a diameter D2 in the order of 12.4 feet and L1 is in the order of sixty feet.

As will be understood by those skilled in the art, the transitions between sections of different diameters will be smooth to facilitate smooth, efficient wind flow and the angles are determined by the differences in the sizes of the areas, their relationships to each other as for example with respect to the central axis B and the length over which the difference in the areas occurs. Nevertheless, for purposes of full and complete disclosure, the sidewalls R13, as shown in cross section in FIG. 1, may be seen to form an angle theta one ($\Theta 1$) with the central axis B which angle $\Theta 1$ is greater than zero. With the sidewalls R13 circular and therefore symmetrical, the included angle $\Theta 1$ also shown in cross section between the opposite sidewalls R13 is $2\Theta 1$. The reduction angles $\Theta$ in each case should provide a smooth and gradual transition from the larger diameter to the smaller diameter and in the embodiment shown is in the order of thirty degrees for the first reduction section R1. Angle $\Theta$ theoretically may be any angle greater than zero and less than 90.

The first reduction section R1 may have a circumferential cylindrical portion R14 extending outwardly from the first end R11 with sides R15 generally parallel to the axis B. It will have the general same diameter D1 and hence a cross sectional internal area generally equal to A1. This portion R14 serves to provide a non accelerating entry. The power section P20 comprises a pipe having an internal area generally equal to A2 and a corresponding diameter generally equal to D2 generally throughout its length from a first end P21 to a second end P22, a length L2 and axis B. In a preferred embodiment the length L2 is less than three miles. It also contains a power extracting means P1 such as will be subsequently explained.

An air flow control means here shown in the form of a gate G1 at a first end P21 of the power section serves to control the flow and pressure of the power section P20 and thereby regulate the amount of air entering and passing through the system to achieve the desired velocity of the air at the power converter means for the power output required. Air flow control means may take various forms such as variable orifice, simple gate, rotating gate, center post damper, etc. The actual type will depend on various factors such as the power requirements, the average pressure and the cross sectional area as would be known to those skilled in the art.

A power converter generally indicated at P1 is shown located at or near the second end P22 of power section P20. This P1 serves to convert the energy in the high speed rush of wind through power section P20 into power of any desired type, e.g. electric, hydraulic, pneumatic, etc. The number, type and locations of the power converters will vary with the configuration of the ACM as well as the number of stations such as shown for example in FIG. 2.

FIGS. 3 and 3A show an embodiment of a power converter P2 that takes the form of a wind turbine with blades P8 whose rotation about a hub generally indicated at P9 drives a generator also generally indicated at P9 that produces power. As shown, the energy converter P2 takes the form of an enlargement of the pipe section which has an area A5 and corresponding diameter D5 that is greater than area A2 and corresponding diameter D2. In one embodiment the area A5 is in the order of 1520 square feet and diameter D5 is in the order of 44 feet. As shown, the portion P9 is streamlined so that the air flows around it with minimum turbulence.

As shown in FIG. 1, second pipe reduction section R2 at the second end P22 of the power section P20 connects the power section P20 to the third or vent section V3.

The second reduction or funnel section R2 has an internal area A2 with a corresponding diameter D2 on a first end R21, an internal area A3 with a diameter D3 on a second end R22, a sidewall R23 extending from the first end R21 to the second end R22 and a length LR2. Sidewalls R23 are inclined to the axis B at an angle determined by A2, A3 and LR2. Again, the angle $\Theta 2$ should provide a smooth and gradual transition from the larger area A2 and diameter D2 to the smaller area and diameter D3. The length LR2 may be in the order of 50 feet. Area A3 is in the order of 12.6 square feet and D3 is in the order of 4 feet.

The third or vent section V3 has a first end V31 connected to the second end of the second reduction section R2 and extends to a second end V32 connected to a first end R31 of third reduction section R3. The third section V3 has an area A3 and a corresponding diameter D3.

The length of section V3 is LV3, which in the preferred embodiment is between sites which historically have closely spaced isobars much of the year and may be in the order of 200 to 400 miles more or less depending on the isobar spacing at the location.

The third reduction section R3, which may be provided to reduce the velocity of air exiting the system, has a length LR3; a first end R31 having an internal area A3 of a diameter D3; a second end R32 open to the atmosphere having an area A4, a corresponding diameter D4; and sidewalls R33. Sidewalls R33 are inclined to the axis B at an angle Θ3 and again should provide a smooth and gradual transition from the smaller area A3 at end R31 to the larger area A4 at the second end R32. The transition configuration is based on the entrance and exit areas and the length over which the transition occurs hence the angles are for illustration purposes.

Again, length L3, which includes lengths LR2, LR3 and LV3 is designed to extend the system pipe conduit including lengths L1 and L2 from sites such as S1 and S2 of barometric pressure historically and typically differing by a useful pressure differential whereby the pressure differences will generate the "clean" megawatts producible by the invention herein.

FIG. 2 shows an example of a network of ACM systems extending between geographically spaced sites of different barometric pressures. It will be understood that the placement of the ACM systems will be proceeded by a study of historical values of barometric pressure to locate areas of historically typically closely spaced isobars, such as shown by the hypothetical placement of the first ACM system ACM-1 in this example. Thus, system ACM-1 is shown extending across seven isobars which would represent a difference of 0.4061 psi. Note that pressure differences of only two isobars (0.116 psi) will produce accelerations of 272 feet per second per second. The extra length is for cases of wider spaced isobars. Station 2 (ACM-2) could be a continuation of station ACM-1.

It will be understood that with the pressure differences there may also be significant differences in the temperature and humidity of the air entering the system and these differences will also produce differences in energy output and operation that must be anticipated and accommodated as will be known to those skilled in the art.

The longer the network and the greater the diversity of the pressure differences, the greater the average yearly pressure differential, and the greater the average yearly power producible. Thus, although only three conduits are shown, there could be any number to achieve the maximum pressure differentials and energy production. A network system requires appropriate air flow control means such as gates to interconnect the highest pressure site with the lowest pressure site and exclude or limit entry from or exit to other sites. In summary, with a construction as set forth in the first embodiment where A1=14,400 square feet; A2=121 square feet; A3=7.07 square feet; L1=60 feet; L2=2000 feet; and L3=300 miles, only two isobars or pressure difference (0.116 psi) between sites would produce about 320,571 horsepower and a pressure difference of seven isobars (0.406 psi) would produce 1,122,275 horsepower, In the first case, acceleration would be 272 feet per second per second and in the second case acceleration would be 952 feet per second per second.

Once the rate of acceleration is known one can go back to the laws of dynamic similarity and adjust the size and rpm to get the desired power with the induced wind velocity. Where the conduit is of one cross sectional area or size throughout its length the cost would be over 130 times more or the acceleration effectiveness would be over 1900 times less. Thus, the differences in size of the areas of the conduit are highly significant to the success and economic viability of the invention.

It is within the scope of this invention to provide internal fins or baffles as required within the conduit to modify turbulence and/or pressure drop. Thus, as shown schematically for example in FIGS. 4 & 5, pairs of counterflow baffles B1 and B2 may be used to generate a tremendous amount of heat by recirculating the fast moving air stream. The amount of heat generated can be nearly all of the wind energy and will vary with the wind speed and the turbulence created by the baffles. The turbulence may be increased or decreased by making the baffles retractable so they are movable into and out of the wind stream by varying amounts. The wind energy is converted directly into heat without a generator or electricity or depletion of materials or pollution of any kind.

Two or more ACM pipes such as shown for example at (#1) (#2) and (#3) of FIG. 2 may be interconnected to maximize the pressure difference between the pipe ends thus greatly increasing the output power as previously detailed with regard to FIG. 2. In such arrangements the appropriate gates will be activated to maximize the pressure differences between pipe ends.

It will be understood that because of the subjective nature of the placement of the openings to achieve a useful difference in barometric pressure the conduits or pipes will have to traverse all types of terrain and accommodate highways, train tracks, rivers, lakes, etc. and in such cases parts or all of the pipe may be above or below the ground or water surface and the pipe may curve and bend as required. Again, the shape of the cross section may be varied and different along its length even though the actual area will be about the same with the biggest determining factor being the preservation of the wind energy. In areas of changes of direction of the pipes, such as at sharp bends, and high velocity internal wind speeds there will be internal forces that have to be compensated and here reinforcements, fins, baffles and abutments of the pipe may be required.

Of course, although not shown, suitable barriers to birds, animals, foreign objects, etc. are provided. Similarly, it is contemplated that water or other substance in the form of liquid mist for example may be added at appropriate points along the conduit length to-the air flow to increase the overall density or weight per cubic foot. This will provide greater power for a given air velocity. It will also allow the use of a smaller turbine for a given horsepower and will allow a lower rpm for a given horsepower. From the laws of Dynamic Similarity it is known that horsepower varies as the square of the density. Thus, a 10% increase in density will provide a 1.21% increase in power for the same air velocity, or it could provide the same power with 60 rpm less (915 rpm vs. 975 rpm), or it could reduce the diameter of the wind turbine by 3.9%, or it could provide for some of each of the above gains.

Likewise as air dew points change with elevation, wind speed and temperature, etc., water may condense out of the air and for this suitable means such as heat generating means or drains with suitable valves may be provided, the exact locations of which are not shown but will be understood by those skilled in the art.

Where the ambient air is colder or other conditions may, from time to time, cause the formation of ice from the moist air inside of the pipe, or where it is desired or required to control the temperature of the flowing air, it is contemplated that heat may be provided by using generated electricity as and where needed to provide such required heat. It is also an important aspect of the invention that baffles such as shown at B1 and B2 in FIGS. 1, 4 and 5 may be placed in the conduit at strategic points where heat may be desired since the baffles serve to generate heat from the air which heat will warm the air as desired to prevent such ice formation and/or control the air temperature. Again, the fins and baffles can reduce turbulence or increase it to convert the wind energy directly into heat without any moving part, without creating pollution and without the depletion of materials. In another approach, some of the electric power generated by the ACM may be used to prevent ice formation or control air temperature.

Also to accommodate the reversals in the direction of air flow caused by changes in barometric pressure, the conduit may be made with a larger cross sectional area section or portion at each end so they produce power regardless of the direction of air flow. The power converters are completely reversible with minimum effort.

Thus, while the location of the openings of the conduits will be planned based on historical records of barometric pressures in various locations, it is expected that the differences may be reversed from time to time so that an area which historically has a higher pressure than another area will from time to time have a lower pressure than the other area whereby the flow in the conduit will be the reverse of what it would normally be. In operation, when the atmospheric high pressure and low pressure areas change places, the appropriate air flow control members such as gates will be activated to interconnect the sites with the greatest barometric pressure difference existing between the various conduit ends.

The method of generating energy according to the invention will be understood to include locating one or more conduits each extending between geographically spaced sites represented in FIG. 1 by Site 1 and Site 2 and in FIG. 2 by ACM #1, 2, and 3; each providing historical useful differences in barometric pressure from the others as shown by the isobars. Each of the conduits have a first opening in a first end of a first portion located at a geographical site of historically higher barometric pressure and a second opening in the end of a second portion ending at a geographic site of historically lower barometric pressure whereby air from the first site will flow toward the second site. The cross sectional area of the first portion is larger than the cross sectional area of the second portions whereby the air flow will be accelerated as it moves through those portions without the use of any mechanical moving parts or depletion of materials or generation of pollution.

Other aspects and steps of the method of the invention include generating power from the high velocity flow of air in the conduit by means of a conversion means such as a wind turbine in the conduit; lengthening the second portion to make it significantly longer than the first portion; controlling the flow of air through the conduit by means of flow control members such as gates or iris type devices; increasing the temperature of the air by causing it to flow around baffles and thereby generate turbulence and heat; varying the heat thus created by moving the baffles into and out of the conduit so that the heat may be used to dissipate frost or ice or water in the conduit and to control the moisture and humidity of the air; using some of the energy created to heat areas and aspects of the system as required for efficient operation; modifying the turbulence and pressure drops by using air directing fin structures in the conduit at strategic places; locally enlarging the conduit in the areas around the power converting means to increase efficiency and maximize power output; maximizing the historical differences in barometric pressure by providing a plurality of interconnected conduits according to the invention and controlling the flow to take advantage of the maximum pressure differences between the plurality of sites to which the conduits extend; and including a funnel shaped section at the entrance at each site with a smooth air flow transition design; increasing the density of the air by adding liquids such as moisture at strategic points along the length of the conduit; controlling ice build up by insulating certain sections or portions of the pipe; and allowing reversal of flow and reversal of the power generating means through the conduit to again maximize barometric pressure differences.

It will thus be understood that the ACM system of the invention overcomes the many disadvantages of the prior art methods of generating power including but not limited to combustible fuel, water, wind and nuclear materials and provides a simple, efficient and environmentally acceptable means for generating megawatts of energy to provide an inexpensive and reliable source of power.

While the disclosed embodiments set forth certain details of some forms of the inventions herein, it will be understood that many other embodiments, forms and variations are contemplated to be within the scope of the following claims and any interpretation of the inventions must be made in light of the scope of such claims.

I claim:

1. An energy generating system comprising at least one long conduit extending between and adapted to conduct air between at least first and second geographically separated sites, said first and second sites being separated to encounter useful historical differences in barometric pressures and said conduits being configured so that air of higher barometric pressure at one site will enter and flow at high velocity through said conduit to the site with lower barometric pressure without the use of any moving parts or the depletion of any material, said conduit having a power converter therein whereby said high velocity air flow between said sites is adapted to drive said power converter to generate power.

2. An energy generating system according to claim 1 wherein said conduit comprises at least first and second portions with said first portion having a first internal area and said second portion having a second internal area, said first portion having a larger internal area than said second portion such that the average through flow of air in said second portion will be of greater velocity than the average though flow in said first portion.

3. An energy generating system according to claim 2 wherein said conduit includes baffles therein which baffles are adapted to create air turbulence and accompanying heat at locations and in intensities as required or desired without the use of moving parts or the depletion of materials.

4. An energy generating system according to claim 3 wherein said baffles are movable into and out of the interior of the conduit to increase or decrease the turbulence and thereby to control the generation of heat therein.

5. An energy generating system according to claim 2 wherein said second portion is longer than said first portion.

6. An energy generating system according to claim 1 wherein said conduit has therein at least one air flow control member adapted to control the flow of air through said conduit.

7. An energy generating system according to claim 1 wherein said conduit is supported by the ground and has portions wholly or partially underground or underwater and has curves and bends along its length.

8. An energy generating system according to claim 1 wherein the conduit includes means for injecting water into said conduit whereby a water mist may be added to the high velocity air flow to increase the density and power of said air flow.

9. An energy generating system according to claim 1 wherein the conduit may have an internal baffle or baffles as required create turbulence to generate heat as desired.

10. An energy generating system according to claim 9 wherein the baffle or baffles are retractable to move into and out of the conduit to respectively increase or decrease the amount of heat generated.

11. An energy generating system according to claim 1 wherein some of the energy obtained from the converter is converted to heat to regulate the temperature of the conduit such as may be required to prevent ice formation.

12. An energy generating system according to claim 1 wherein the conduit is insulated in parts as desired.

13. An energy generating system according to claim 1 wherein said first and second portions have respective first and second cross sectional internal areas and wherein said first and second internal areas are generally equal.

14. An energy generating system according to claim 6 wherein said conduit is locally enlarged in the area of said power converter.

15. An energy generating system according to claim 1 wherein said system includes two or more of said conduits interconnected to each other with flow control means therein, each of said two or more conduits having an air receiving opening geographically spaced from the other openings whereby said spaced openings will encounter useful historical differences in barometric pressure to provide a greater choice and greater differences in barometric pressure to better achieve the desired output of power of the total system.

16. An energy generating system according to claim 15 wherein the flow of air in said conduits is reversible and the power generating means is reversible to be able to generate power regardless of the direction of flow of air through said conduits.

17. An energy generating system according to claim 15 wherein each of said conduits includes at least one power generating means and at least one air flow control member.

18. An energy generating system for generating megawatts of power comprising a conduit for conducting air, said conduit having first and second ends with first and second openings respectively, said conduit being of sufficient length to encounter a useful difference in barometric pressure between said first and second openings, said conduit including portions of first second and third lengths and internal cross sectional areas of first through fourth areas, said first opening being equal in area to said first area and said second opening being equal in area to said fourth area.

19. An energy generating system according to claim 18 wherein said conduit has therein at least one power converter for converting the power of wind in said conduit into energy; at least a first reduction section, and at least one flow control means.

20. An energy generating system according to claim 19 wherein said first reduction section is defined by said first area at a first end; said second area at a second end and a funnel shaped portion extending a first length whereby the reduction section provides a smooth transition for air flowing through said section.

21. An energy generating system according to claim 18 wherein the first through fourth areas are equal.

22. An energy generating system according to claim 18 wherein there are at least two conduits and they are interconnected and include a means to regulate the conduit or conduits through which air will be allowed to flow to generate the energy.

23. An energy generating system according to claim 19 wherein wind driven power converter is in the second length and the cross sectional area of the wind driven power converter is larger than the second area.

24. An energy generating system according to claim 18 wherein said first end has a first reduction section in the form of an enlarged funnel shaped opening, said funnel having a large internal first area at a first end and a smaller internal area at a second end, said second end of said funnel being connected to said first section whereby the velocity of flow of air at said second internal area will be greater than the velocity of flow at said first end of said funnel.

25. An energy generating system according to claim 24 wherein said second section has a third reduction portion of a general funnel shape, said reduction portion having a first end attached to said second section and a second end open to the atmosphere.

26. An energy generating system according to claim 25 wherein said first and second reduction portions have a central axis and sidewalls, said sidewalls being inclined to said axis to provide a smooth and gradual transition of air into each of said first and second reduction portions.

27. A method of generating megawatts of energy comprising the steps of locating one or more interconnected conduits each extending between geographically spaced sites having historical useful differences in barometric pressures, each of said one or more conduits having a first opening at a geographic site of historically higher barometric pressure and a second opening at a geographic site of historically lower barometric pressure, accelerating the flow of air in said conduit by making the cross sectional area of a first portion of the conduit leading away from the first site larger than the area of a second portion of said conduit leading to said second site whereby air from said first site will flow and accelerate as it moves toward said second site without the use of moving parts or the depletion of materials, and locating an energy converting means in the air flow for converting the energy in said flow of air into power.

28. A method of generating megawatts of energy according to claim 27 comprising the additional step of controlling the flow of air through each of said conduits.

29. A method of generating megawatts of energy according to claim 27 including the step of creating heat in said conduit by including counterflow baffles that protrude into said conduit by a distance as needed or desired to generate turbulence and accompanying heat that may be used to control the temperature of the air flowing through said conduit.

30. A method of generating power according to claim 29 including the step of varying the extent to which the counterflow baffles protrude into the conduit to vary the turbulence and heat produced.

31. A method according to claim 27 including the step of adding moisture to the air to increase its density and the power.

32. A method according to claim 27 including the step of controlling the flow of air through said one or more conduits so that the conduits extending between the sites having the greatest difference of air pressure will be operating to produce energy.

33. A method according to claim 27 including the step of controlling the temperature of the air and the conduit at various points in the conduit to regulate the air density and humidity.

* * * * *